United States Patent [19]

Tams

[11] Patent Number: 4,762,142

[45] Date of Patent: Aug. 9, 1988

[54] METERED FLOAT CONTROLLED VALVE

[76] Inventor: Joseph Tams, 23016 Jacobson Rd., Brooksville, Fla. 33512

[21] Appl. No.: 131,491

[22] Filed: Dec. 10, 1987

[51] Int. Cl.$^4$ .................. F16K 43/00; F16K 31/26; F16K 33/00
[52] U.S. Cl. .................... 437/315; 137/436; 137/442; 137/446; 251/126; 251/324
[58] Field of Search ............... 137/315, 434, 436, 442, 137/443, 444, 446, 450; 138/37, 40, 44; 251/126, 324

[56] References Cited

U.S. PATENT DOCUMENTS

| | | |
|---|---|---|
| 449,351 | 3/1891 | Keyworth, Jr. ............ 137/436 |
| 756,538 | 4/1904 | Smith ....................... 137/436 |
| 945,569 | 1/1910 | Millea ....................... 137/444 |
| 1,173,871 | 2/1916 | Royer ....................... 137/436 |
| 1,612,857 | 1/1927 | Donnelly .................. 137/436 |
| 1,734,762 | 11/1929 | Clemmons ................ 251/126 |
| 1,762,306 | 6/1930 | Mueller .................... 137/446 |
| 2,715,415 | 8/1955 | Tucker ..................... 137/450 |
| 4,177,829 | 12/1979 | Friedman .................. 137/446 |
| 4,312,083 | 1/1982 | Imler ....................... 137/446 |

FOREIGN PATENT DOCUMENTS 293202 7/1928 United Kingdom ............... 137/436

Primary Examiner—George L. Walton
Attorney, Agent, or Firm—Sughrue, Mion, Zinn, Macpeak, and Seas

[57] ABSTRACT

The float operated control valve includes a one-piece molded plastic valve body having a valve chamber, a first cylindrical extension defining an inlet chamber in communication with the valve chamber, a second cylindrical projection defining an outlet chamber in communication with the valve chamber and disposed at right angles to the first cylindrical projection and a third cylindrical projection having a cylindrical passage in which a plunger is slidably mounted. The plunger has a valve member mounted on one end thereof within the valve chamber for engagement with a valve seat surrounding a passage between the inlet chamber and the valve chamber. A diverter plate is disposed at an angle to the axis of the first and second cylindrical projections for diverting the fluid entering the valve chamber from the inlet chamber toward the outlet chamber. An apertured plate is detachably mounted in the inlet chamber for providing turbulence to reduce the pressure and to prevent the passage of large particles which would damage the valve member.

4 Claims, 2 Drawing Sheets

METERED FLOAT CONTROLLED VALVE

BACKGROUND OF THE INVENTION

The present invention is directed to a float controlled valve for automatically controlling the replenishment of liquid to a large body of liquid from a source of liquid under pressure.

Most prior art float controlled valves deal with toilet tank operations. Such float controlled valves are designed for relatively small volumes of liquid flow on the order or 3-5 gallons per flushing operation. These valves generally have complex mechanical lever actions, passageways for liquid to assist the flush lever, double shutoffs, anti-siphon prevention and other actions specifically related to toilet tank operations. An example of such a valve is disclosed in the U.S. Pat. No. 4,312,083 to Imler. The U.S. Pat. No. 4,177,829 to Friedman is also directed to a float controlled valve wherein the valve member is moved away from the valve seat by the pressure of the water and is moved into engagement with the valve seat by means of a float operated cam member. The passages for the replenishment liquid extend directly through the valve member.

A prior art valve construction is shown in FIG. 5 of the present application, wherein the inlet chamber and the outlet chamber are disposed at right angles to each other in communication with a valve chamber. A valve is secured to one end of a plunger and engages a seat surrounding an aperture in communication with the inlet chamber while the opposite end of the valve carrying plunger extends outwardly of the valve chamber for engagement by lever means controlled by a float valve. A metered control of the flow of water through the valve chamber from the inlet chamber to the outlet chamber is difficult to achieve due to the direct pressure of the inlet fluid against the portion of the plunger which is slidably mounted in the valve chamber for engagement by the float mechanism. Furthermore, since the valve sealing material of the valve member is directly exposed to the force of the incoming fluid through the inlet chamber and valve chamber, any particles of foreign material in the fluid will cause severe abrasion or damage to the valve member. The U.S. Pat. No. 1,677,687 to Reed and the U.S. Pat. No. 1,762,306 to Mueller shows similar float controlled valve arrangements which have the same drawbacks as the arrangement in FIG. 5.

SUMMARY OF THE INVENTION

The present invention provides a new and improved float operated control valve which overcomes all of the disadvantages of the prior art valve constructions discussed above.

The present invention provides a new and improved float controlled valve having an apertured flow control plate removably mounted in the inlet chamber which will cause turbulence within the inlet chamber thereby reducing the direct pressure of the inlet fluid on the valve member, reducing the force necessary to control the movement of the valve member and reducing the amount of abrasive wear on the valve member. A diverter plate is disposed at an angle to the axis of the valve member in the valve chamber so as to deflect the incoming fluid from the inlet chamber directly to the outlet chamber and prevent undue fluid force against the portion of the valve plunger slidably disposed in the valve body. The valve member per se is provided with a rounded configuration in engagement with the valve seat and a flange is provided on the valve plunger to divert the incoming fluid radially outwardly from the axis of the valve plunger into engagement with the diverter plate.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
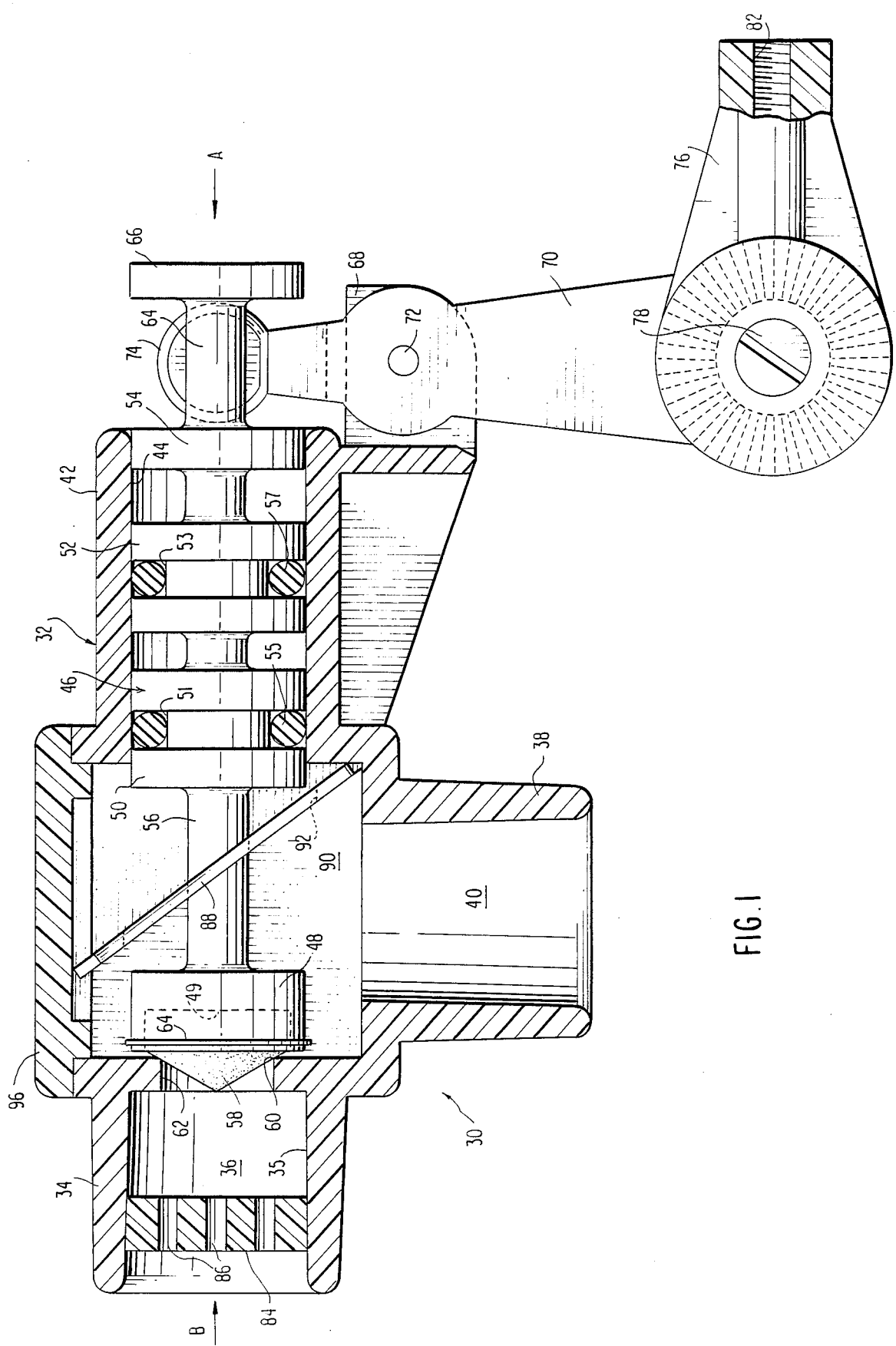
FIG. 1 is a side elevation view, partly in section of the float controlled valve according to the present invention.
Figure 5:
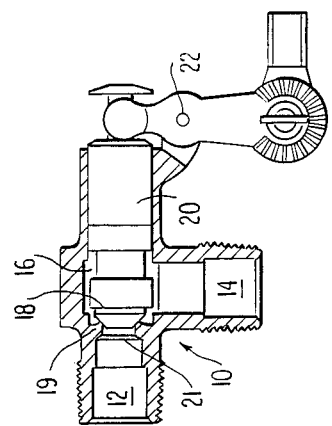
FIG. 5 is a side elevation view, partly in section, of a prior art valve construction.
Figure 3:
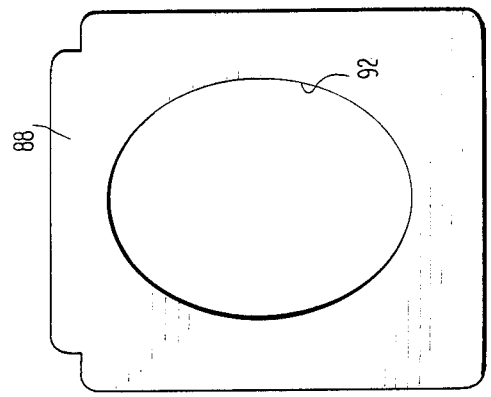
FIG. 3 is a plan view of the diverter plate used in the valve according to the present invention.
Figure 4:
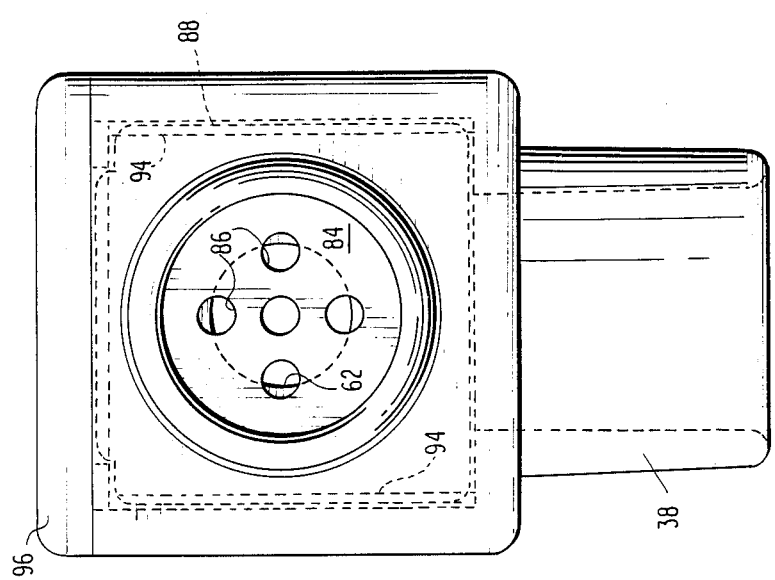
FIG. 4 is an end elevation view taken in the direction of the arrow B in FIG. 1.
Figure 2:
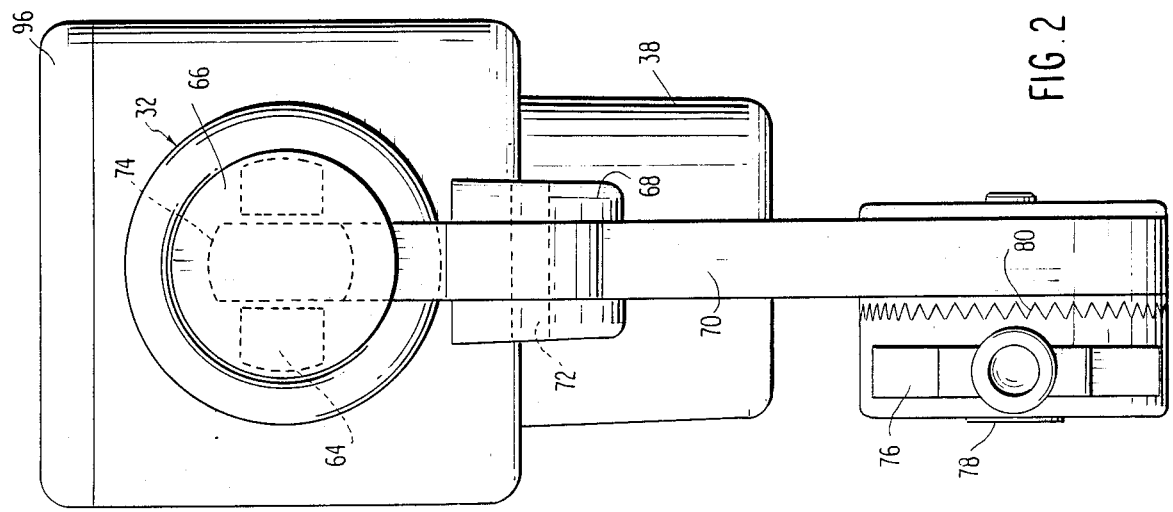
FIG. 2 is an end elevation view of the valve shown in FIG. 1 taken in the direction of the arrow A.

The valve member 30 according to the present invention is best seen in FIG. 1 wherein a unitary one-piece valve housing 32 is molded of plastic material and includes a first cylindrical projection 34 defining an inlet chamber 36 and a second cylindrical projection 38 disposed at right angles to the first cylindrical projection 34 defining an outlet chamber 40. A third cylindrical projection 42 defines a guide chamber 44 in which a plunger 46 is slidably disposed.

The plunger 46 is comprised of a one piece molded plastic member having a plurality of large diameter head portions 48, 50, 52 and 54 disposed in spaced relation along a reduced diameter stem portion 56. The head portion 48 is provided with a cylindrical recess 49 in the end thereof in which a valve member 58 of suitable elastomeric material is secured. The portion of the valve member 58 protruding from the recess 49 is provided with a conical or rounded configuration for engagement with a valve seat 60 extending about the periphery of the inlet passage 62. An annular flange 64 extends about the outer periphery of the head 48 adjacent the end thereof from which the valve member 58 protrudes. The head portions 50 and 52 are provided with annular recesses 51 and 53 respectively in which O rings 55 and 57 are mounted for sealing engagement with the inner surface of the cylindrical projection 42. A pair of spaced apart axially extending connecting members 65, only one of which is seen in FIG. 1, extend between the head portion 54 and an end plate 66 identical to the head portion 54.

A pair of flanges 68, only one of which is shown in FIG. 1 are integrally molded with the valve body 32. An operating lever 70 of plastic material is pivotally mounted on a pin 72 detachably mounted in the flanges 68. One end of the lever 70 is provided with a rounded head portion 74 which is disposed in engagement with the plates 54 and 66 with minimal clearance therebetween so that upon pivoting of the lever 70 in the counter-clockwise direction the valve member 58 will be moved into engagement with the valve seat 60 and upon movement of the lever 70 in the clockwise direction the valve member 58 will be moved out of engagement with the valve seat 60. The float supporting lever 76 of plastic material is threaded on a screw member 78 which is freely rotatable in an aperture in the end of the lever 70. The adjacent surfaces of the lever 76 and the lever 70 are provided with a plurality of complementary radially extending teeth 80 which will engage each other upon tightening of the screws 78 so as to hold the levers 70 and 76 in the desired angular relationship with respect to each other. A threaded recess 82 is provided in the end of lever 76 for reception of the threaded end of a float supporting rod (not shown).

The cylindrical extension 34 defining the inlet chamber 36 is provided with a tapered inner surface 35, the diameter of which is gradually reduced from left to right as viewed in FIG. 1. A disk 84 having a plurality of apertures 86 is pushed into wedging engagement with the tapered inner surface 35 so as to hold the disk in place. The apertures 86 may vary in number and size so that the flow of fluid into the inlet chamber 36 may be selectively controlled. The flow of fluid through the apertures 86 will also create turbulence in the fluid within the chamber 36 thereby reducing the pressure against the valve member 58, thereby enabling the float control lever 70 to maintain a more accurate control over the flow of fluid through the aperture 62.

A diverter plate 88 is mounted diagonally within the valve chamber 90 so as to divert the main flow of fluid passing around the valve member 86 and over the flange 64 outwardly through the outlet chamber 40. The diverter plate 88 is provided with an oblong or oval aperture 92 having dimensions sufficient to enable the passage of the valve body 46 through the aperture 92 so that the valve body 46 may be completely removed to permit cleaning and replacement of the valve member 58 and the seals 55 and 57. The pin 72 upon which the lever 70 is mounted is removable from the flanges 68 so that the head 74 of the lever 70 may be withdrawn from between the plates 54 and 66 to facilitate removal of the valve body 46. The provision of the diverter plate 88 will also prevent the direct impingement of high pressure fluid against the first enlargement 50 and the seal 55 therein so as to reduce adverse pressures on these elements to increase the accuracy of operation and lengthen the life of the seal. In order to maintain the diverter plate 88 at the desired angle supporting shoulders 94 are formed integrally on the inner walls of the valve body 32 within the valve chamber 90. After positioning the plate 88 on the shoulders 94, the cover 96 may be detachably or permanently pressed into sealing relation with the valve body 32 to close the chamber 90.

While the invention has been particularly shown and described with reference to a preferred embodiment thereof, it will be understood by those in the art that the foregoing and other changes in form and detail may be made therein without departing from the spirit and scope of the invention.

What is claimed is:

1. A metered float controlled valve comprising a valve body having means defining a valve chamber, a first cylindrical projection defining an inlet chamber having a first passage in communication with said valve chamber, a second cylindrical projection disposed at right angles to said first cylindrical projection defining an outlet chamber having a second passage in communication with said valve chamber, a third cylindrical projection disposed in alignment with said first cylindrical projection and having a cylindrical passage in communication with said valve chamber, a substantially cylindrical plunger slidably mounted in said cylindrical passage and having a valve member secured to one end thereof with the opposite end thereof extending outwardly of said cylindrical passage for engagement with operating means and a diverter plate disposed in said valve chamber at an angle to the axes of said first and second cylindrical projections and provided with a central aperture for the passage of said plunger therein for easy insertion and removal of said plunger and valve member without removing said diverter plate whereby said diverter plate will deflect fluid entering said valve chamber from said inlet chamber toward said outlet chamber and away from said third cylindrical projection to prevent undue pressure thereto.

2. A metered float controlled valve as set forth in claim 1 further comprising lever means pivoted on said valve body and having one arm thereof disposed in engagement with the end of said plunger extending outwardly of said cylindrical passage and a second arm adapted to be operatively connected to a float member.

3. A float controlled valve member as set forth in claim 1 further comprising removably mounted apertured plate means mounted in said inlet chamber to reduce the pressure of the fluid and cause turbulence in the fluid entering said valve chamber.

4. A float controlled valve means as set forth in claim 1 further comprising sealing means between said plunger and said cylindrical passage.

* * * * *